(12) United States Patent
Mueller et al.

(10) Patent No.: US 9,052,043 B2
(45) Date of Patent: Jun. 9, 2015

(54) WIRED PIPE COUPLER CONNECTOR

(71) Applicants: Stephan Mueller, Celle (DE); Volker Krueger, Celle (DE); Christian Fulda, Lower Saxony (DE); Ingo Roders, Seelze (DE); VolkeR Peters, Wienhausen (DE)

(72) Inventors: Stephan Mueller, Celle (DE); Volker Krueger, Celle (DE); Christian Fulda, Lower Saxony (DE); Ingo Roders, Seelze (DE); VolkeR Peters, Wienhausen (DE)

(73) Assignee: Baker Hughes Incorporated, Houston, TX (US)

( * ) Notice: Subject to any disclaimer, the term of this patent is extended or adjusted under 35 U.S.C. 154(b) by 59 days.

(21) Appl. No.: 13/687,699

(22) Filed: Nov. 28, 2012

(65) Prior Publication Data
US 2014/0148029 A1 May 29, 2014

(51) Int. Cl.
*H01R 4/60* (2006.01)
*F16L 25/01* (2006.01)
*F16L 15/00* (2006.01)

(52) U.S. Cl.
CPC *F16L 25/01* (2013.01); *F16L 15/00* (2013.01)

(58) Field of Classification Search
USPC ............. 439/191, 194, 205, 462; 175/320; 174/75 C
See application file for complete search history.

(56) References Cited

U.S. PATENT DOCUMENTS

| 2,178,931 | A | | 11/1939 | Crites et al. |
|---|---|---|---|---|
| 3,253,245 | A | | 5/1966 | Brandt |
| 4,117,287 | A | | 9/1978 | Walker et al. |
| 4,445,734 | A | | 5/1984 | Cunningham |
| 4,585,287 | A | * | 4/1986 | Ramsey et al. ............... 439/588 |
| 4,792,309 | A | | 12/1988 | Chu |
| 5,070,940 | A | | 12/1991 | Conner et al. |
| 5,221,214 | A | * | 6/1993 | Martin .......................... 439/191 |
| 5,318,460 | A | * | 6/1994 | Gilbert ..................... 439/620.26 |
| 5,389,003 | A | | 2/1995 | Van Steenwyk et al. |
| 5,700,161 | A | | 12/1997 | Plummer et al. |
| 5,735,695 | A | | 4/1998 | Heinrich |
| 5,823,256 | A | | 10/1998 | Moore |
| 5,833,490 | A | * | 11/1998 | Bouldin ........................ 439/462 |
| 5,865,654 | A | | 2/1999 | Shimirak et al. |
| 5,869,784 | A | * | 2/1999 | Shinchi ........................ 174/84 R |
| 5,967,816 | A | | 10/1999 | Sampa et al. |
| 6,027,373 | A | * | 2/2000 | Gray et al. ..................... 439/578 |
| 6,062,905 | A | | 5/2000 | Sampa et al. |
| 6,125,533 | A | * | 10/2000 | Warner et al. .................... 29/868 |
| 6,142,237 | A | | 11/2000 | Christmas et al. |

(Continued)

OTHER PUBLICATIONS

Notification of Transmittal of the International Search Report and the Written Opinion of the International Searching Authority, or the Declaration; PCT/US2013/071177; Feb. 25, 2014 15 pages.

(Continued)

*Primary Examiner* — Alexander Gilman
(74) *Attorney, Agent, or Firm* — Cantor Colburn LLP

(57) ABSTRACT

A wired pipe segment includes a body extending from a box end to a pin end and a coupler located in one of the box end or the pin end, the coupler including a communication element and a coupler connector in electrical communication therewith and extending away from the communication element. The segment also includes a transmission line extending away from the coupler towards the other of the box and pin end, the transmission line including an inner conductor surrounded by an insulating material, the inner conductor of the transmission line having an end with a non-cylindrical shape. The segment also includes a connector that electrically connects the coupler to the transmission line.

18 Claims, 9 Drawing Sheets

(56) References Cited

U.S. PATENT DOCUMENTS

| | | |
|---|---|---|
| 6,398,593 B1 | 6/2002 | Yeh |
| 6,407,722 B1 | 6/2002 | Bogner et al. |
| 6,443,780 B2 | 9/2002 | Wilbourn et al. |
| 6,565,129 B2 | 5/2003 | Surjaatmadja |
| 6,568,945 B2 | 5/2003 | Whybrow |
| 6,676,447 B1 | 1/2004 | Knox |
| 6,766,853 B2 | 7/2004 | Restarick et al. |
| 6,776,636 B1 | 8/2004 | Cameron et al. |
| 6,780,037 B1 | 8/2004 | Parmeter et al. |
| 6,790,082 B2 | 9/2004 | Obayashi |
| 6,800,809 B2 | 10/2004 | Moe et al. |
| 6,821,147 B1 | 11/2004 | Hall et al. |
| 6,830,467 B2 * | 12/2004 | Hall et al. .................... 439/194 |
| 6,844,498 B2 * | 1/2005 | Hall et al. .................... 174/75 C |
| 6,929,493 B2 | 8/2005 | Hall et al. |
| 6,945,802 B2 * | 9/2005 | Hall et al. .................... 439/194 |
| 6,968,611 B2 * | 11/2005 | Hall et al. .................... 29/745 |
| 7,128,619 B1 | 10/2006 | Muench, Jr. |
| 7,362,235 B1 | 4/2008 | Normann et al. |
| 7,405,358 B2 | 7/2008 | Emerson |
| 7,488,194 B2 | 2/2009 | Hall et al. |
| 7,565,936 B2 * | 7/2009 | Zhang et al. .................... 175/320 |
| 7,649,475 B2 * | 1/2010 | Hall et al. .................... 340/854.9 |
| 8,066,033 B2 | 11/2011 | Quigley et al. |
| 8,187,687 B2 | 5/2012 | Wideman et al. |
| 8,297,345 B2 | 10/2012 | Emerson |
| 8,635,770 B2 * | 1/2014 | Warner .................... 29/858 |
| 2002/0193004 A1 | 12/2002 | Boyle et al. |
| 2005/0039912 A1 | 2/2005 | Hall et al. |
| 2005/0070144 A1 | 3/2005 | Hall et al. |
| 2005/0095827 A1 * | 5/2005 | Hall et al. .................... 438/578 |
| 2005/0236160 A1 | 10/2005 | Hall et al. |
| 2006/0108803 A1 | 5/2006 | Reynolds, Jr. |
| 2006/0283606 A1 | 12/2006 | Partouche et al. |
| 2007/0149033 A1 * | 6/2007 | Hanks .................... 439/404 |
| 2007/0167051 A1 | 7/2007 | Reynolds, Jr. |
| 2010/0264650 A1 | 10/2010 | Braden et al. |

OTHER PUBLICATIONS

Shah, et al. "Design Considerations for a New High Data Rate LWD Acoustic Telemetry System" SPE 88636. SPE Asia Pacific Oil and Gas Conference and Exhibition held in Perth, Australia, Oct. 18-20, 2004. 7 pages.

\* cited by examiner

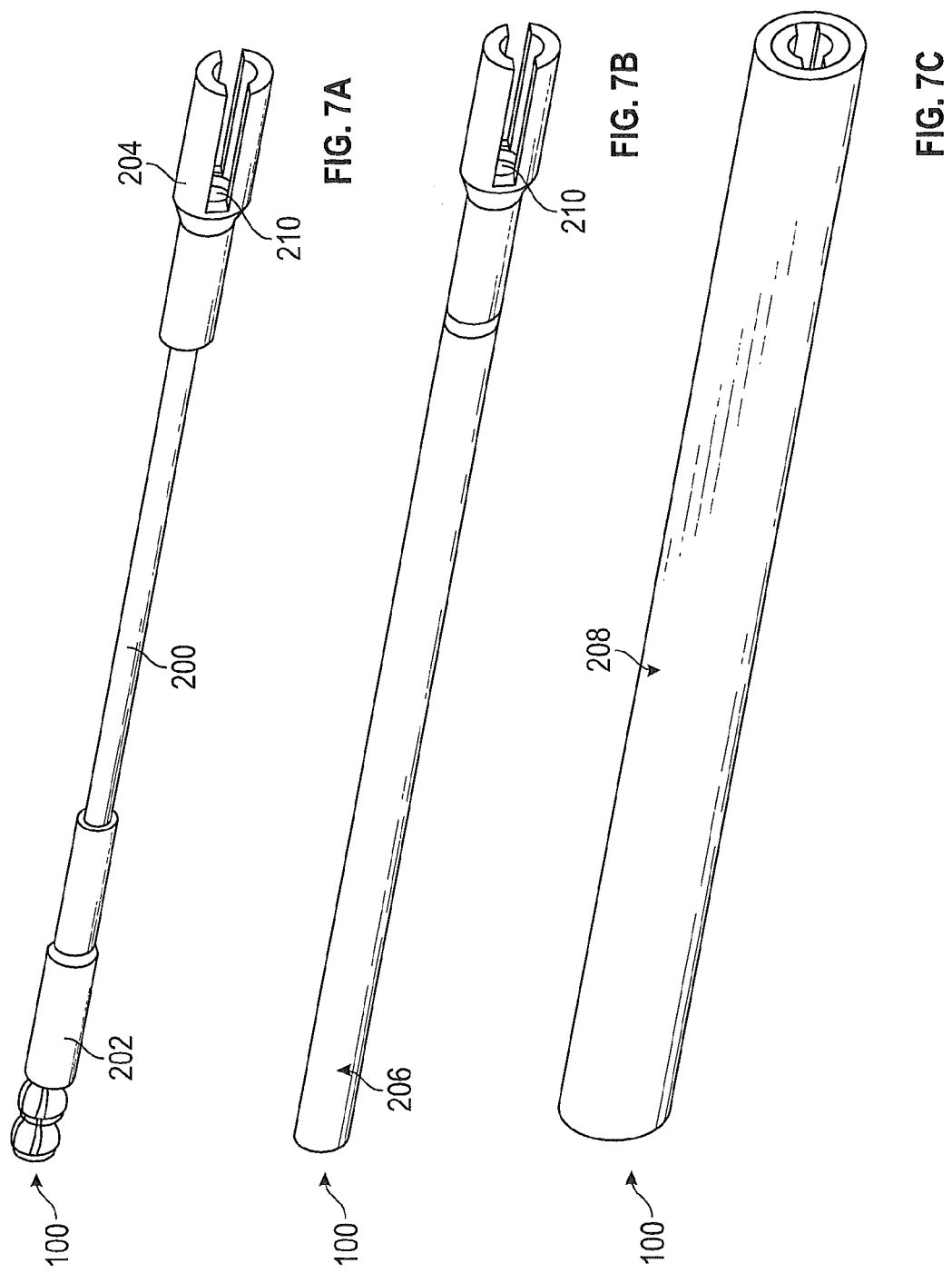

WIRED PIPE COUPLER CONNECTOR

BACKGROUND

During subterranean drilling and completion operations, a pipe or other conduit is lowered into a borehole in an earth formation during or after drilling operations. Such pipes are generally configured as multiple pipe segments to form a "string", such as a drill string or production string. As the string is lowered into the borehole, additional pipe segments are coupled to the string by various coupling mechanisms, such as threaded couplings.

Various power and/or communication signals may be transmitted through the pipe segments via a "wired pipe" configuration. Such configurations include electrical, optical or other conductors extending along the length of selected pipe segments. The conductors are operably connected between pipe segments by a variety of coupling configurations.

One such coupling configuration includes a threaded male-female configuration often referred to as a pin box connection. The pin box connection includes a male member, i.e., a "pin" that includes an exterior threaded portion, and a female member, i.e., a "box", that includes an interior threaded portion and is configured to receive the pin in a threaded connection.

Some wired pipe configurations include a transmission device mounted on the tip of the pin as well as in the box end. The transmission device, or "coupler," can transmit power, data or both to an adjacent coupler. The coupler in the pin end is typically connected via a coaxial cable to the coupler in the box end.

BRIEF DESCRIPTION

Disclosed herein a wired pipe segment that includes a body extending from a box end to a pin end and a coupler located in one of the box end or the pin end, the coupler including a communication element and a coupler connector in electrical communication therewith and extending away from the communication element. The segment also includes a transmission line extending away from the coupler towards the other of the box and pin end, the transmission line including an inner conductor surrounded by an insulating material, the inner conductor of the transmission line having an end with a non-cylindrical shape. The segment also includes a connector that electrically connects the coupler to the transmission line.

Also disclosed is a connector for use in connecting a communication element to a transmission line in a wired pipe segment. The connector includes a first end adapted to make electrical contact with a coupler connector that extends away from a communication element of the coupler and a second end configured to mate with an end of the inner conductor of the transmission line, the end of the inner conductor having non-cylindrical cross section.

BRIEF DESCRIPTION OF THE DRAWINGS

The following descriptions should not be considered limiting in any way. With reference to the accompanying drawings, like elements are numbered alike:

FIGS. 7A-7C illustrate the construction of one embodiment of a connector;

DETAILED DESCRIPTION

A detailed description of one or more embodiments of the disclosed system, apparatus and method are presented herein by way of exemplification and not limitation with reference to the Figures.

Figure 1:
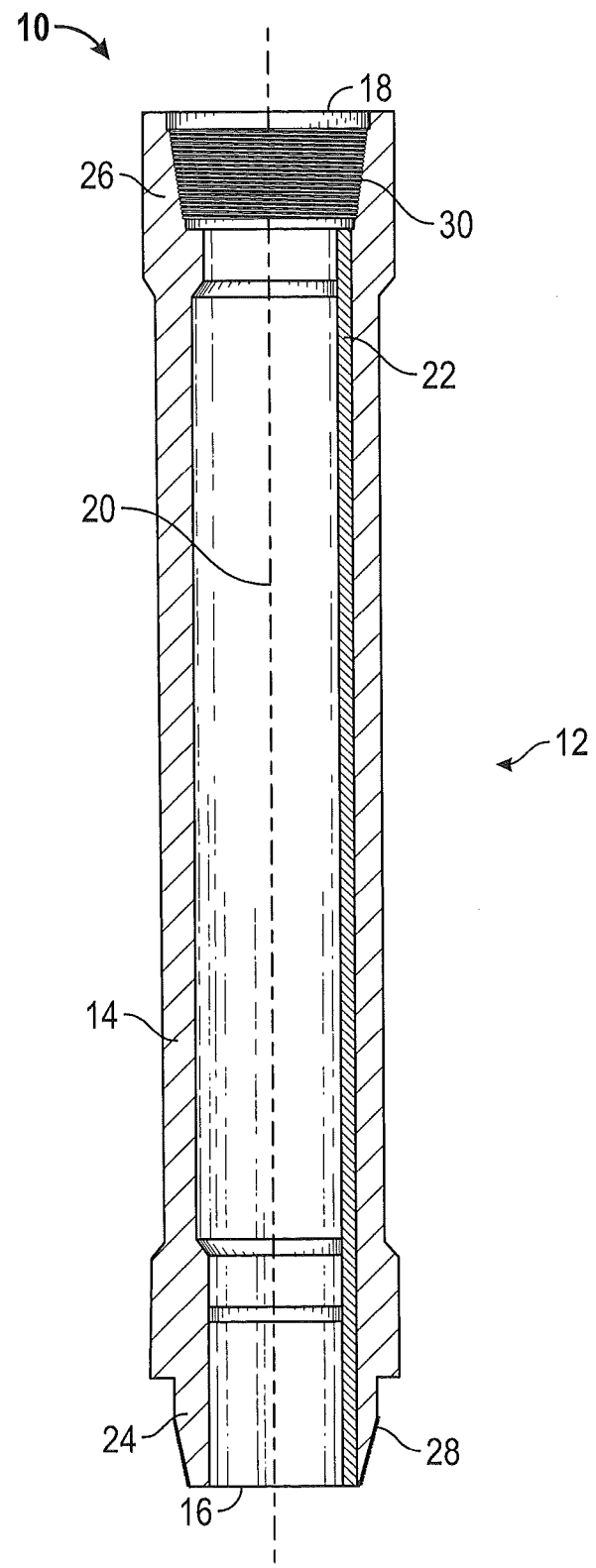
FIG. 1 depicts an exemplary embodiment of a wired pipe segment of a well drilling and/or logging system.

Referring to FIG. 1, an exemplary embodiment of a portion of a well drilling, logging and/or production system 10 includes a conduit or string 12, such as a drillstring or production string, that is configured to be disposed in a borehole for performing operations such as drilling the borehole, making measurements of properties of the borehole and/or the surrounding formation downhole, or facilitating gas or liquid production.

For example, during drilling operations, drilling fluid or drilling "mud" is introduced into the string 12 from a source such as a mud tank or "pit" and is circulated under pressure through the string 12, for example via one or more mud pumps. The drilling fluid passes into the string 12 and is discharged at the bottom of the borehole through an opening in a drill bit located at the downhole end of the string 12. The drilling fluid circulates uphole between the string 12 and the borehole wall and is discharged into the mud tank or other location.

The string 12 may include at least one wired pipe segment 14 having an uphole end 18 and a downhole end 16. As described herein, "uphole" refers to a location near the point where the drilling started relative to a reference location when the segment 14 is disposed in a borehole, and "downhole" refers to a location away from the point where the drilling started along the borehole relative to the reference location. It shall be understood that the uphole end 18 could be below the downhole end 16 without departing from the scope of the disclosure herein.

At least an inner bore or other conduit 20 extends along the length of each segment 14 to allow drilling mud or other fluids to flow therethrough. A transmission line 22 is located within the wired segment 14 to provide protection for electrical, optical or other conductors to be disposed along the wired segment 14. In one embodiment, the transmission line 22 is a coaxial cable. In another embodiment, the transmission line 22 is formed of any manner of carrying power or data, including, for example, a twisted pair. In the case where the transmission line 22 is a coaxial cable it may include an inner conductor surrounded by a dielectric material. The coaxial cable may also include a shield layer that surrounds the dielectric. In one embodiment, the shield layer is electrically coupled to an outer conductor that may be formed, for example, by a rigid or semi-rigid tube of a conductive material.

The segment 14 includes a downhole connection 24 and an uphole connection 26. The segment 14 is configured so that the uphole connection 26 is positioned at an uphole location relative to the downhole connection 24. The downhole connectoin 24 includes a male coupling portion 28 having an exterior threaded section, and is referred to herein as a "pin end" 24. The uphole connection 26 includes a female coupling portion 30 having an interior threaded section, and is referred to herein as a "box end" 26.

The pin end 24 and the box end 26 are configured so that the pin end 24 of one wired pipe segment 14 can be disposed within the box end 26 of another wired pipe segment 14 to effect a fixed connection therebetween to connect the segment 14 with another adjacent segment 14 or other downhole component. In one embodiment, the exterior of the male coupling portion 28 and the interior of the female coupling portion 30 are tapered. Although the pin end 24 and the box end 26 are described has having threaded portions, the pin end 24 and the box end 26 may be configured to be coupled using any suitable mechanism, such as bolts or screws or an interference fit.

In one embodiment, the system 10 is operably connected to a downhole or surface processing unit which may act to control various components of the system 10, such as drilling, logging and production components or subs. Other components include machinery to raise or lower segments 14 and operably couple segments 14, and transmission devices. The downhole or surface processing unit may also collect and process data generated by the system 10 during drilling, production or other operations.

As described herein, "drillstring" or "string" refers to any structure or carrier suitable for lowering a tool through a borehole or connecting a drill bit to the surface, and is not limited to the structure and configuration described herein. For example, a string could be configured as a drillstring, hydrocarbon production string or formation evaluation string. The term "carrier" as used herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, BHA's and drill strings.

Figure 2:
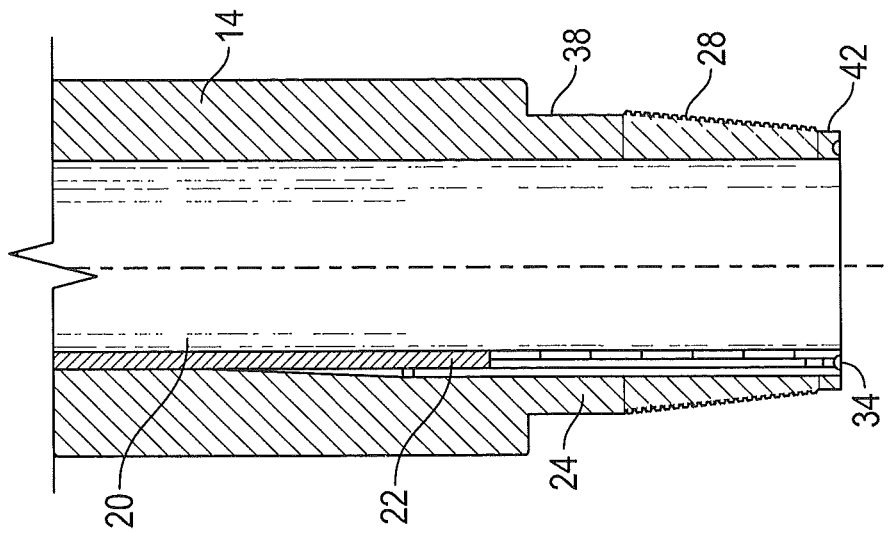
FIG. 2 depicts an exemplary embodiment of a box connector of the segment of FIG. 1.
Figure 3:
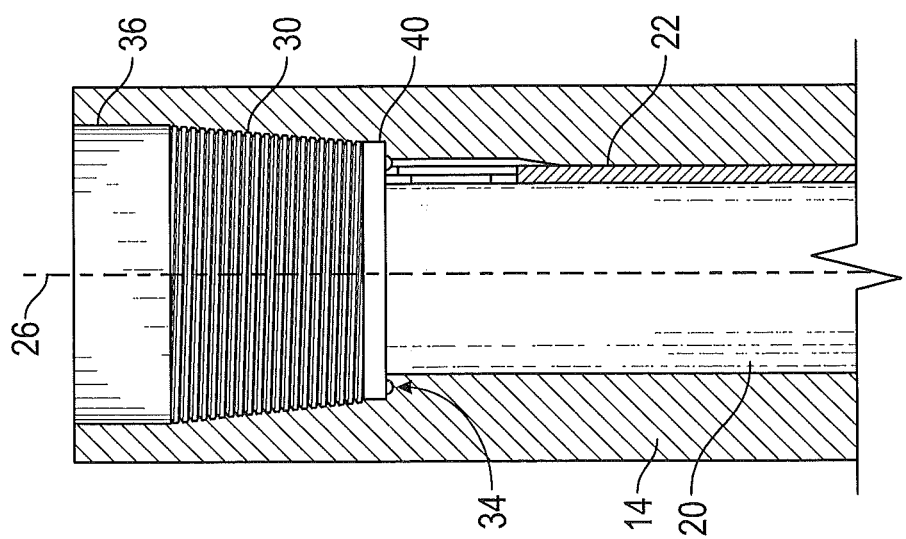
FIG. 3 depicts an exemplary embodiment of a pin connector of the segment of FIG. 1.

Referring to FIGS. 2 and 3, the segment 14 includes at least one transmission device 34 (also referred to as a "coupler" herein) disposed therein and located at the pin end 24 and/or the box end 26. The transmission device 34 is configured to provide communication of at least one of data and power between adjacent segments 14 when the pin end 24 and the box end 26 are engaged. The transmission device 34 may be of any suitable type, such as an inductive coil, direct electrical contacts and an optical connection ring. The coupler may be disposed at the inner or outer shoulder. Further, the transmission device 34 may be a resonant coupler. The each of these types of couplers shall be referred to as including a communication element that allows it to communicate a signal to another coupler. It shall be understood that the transmission device 34 could also be included in a repeater element disposed between adjacent segments 14 (e.g, within the box end). In such a case, the data/power is transmitted from the transmission device in one segment, into the repeater. The signal may then be passed "as is," amplified, and/or modified in the repeater and provided to the adjacent segment 14.

Regardless of the configuration, it shall be understood that each transmission device 34 can be connected to one or more transmission lines 22. Embodiments disclosed herein are directed to a connector that is used to connect a transmission device to a transmission line. The connection could be galvanic or capacitive, for example. The term "direct" as used with respect to a connection shall include a galvanic connection.

Figure 4:
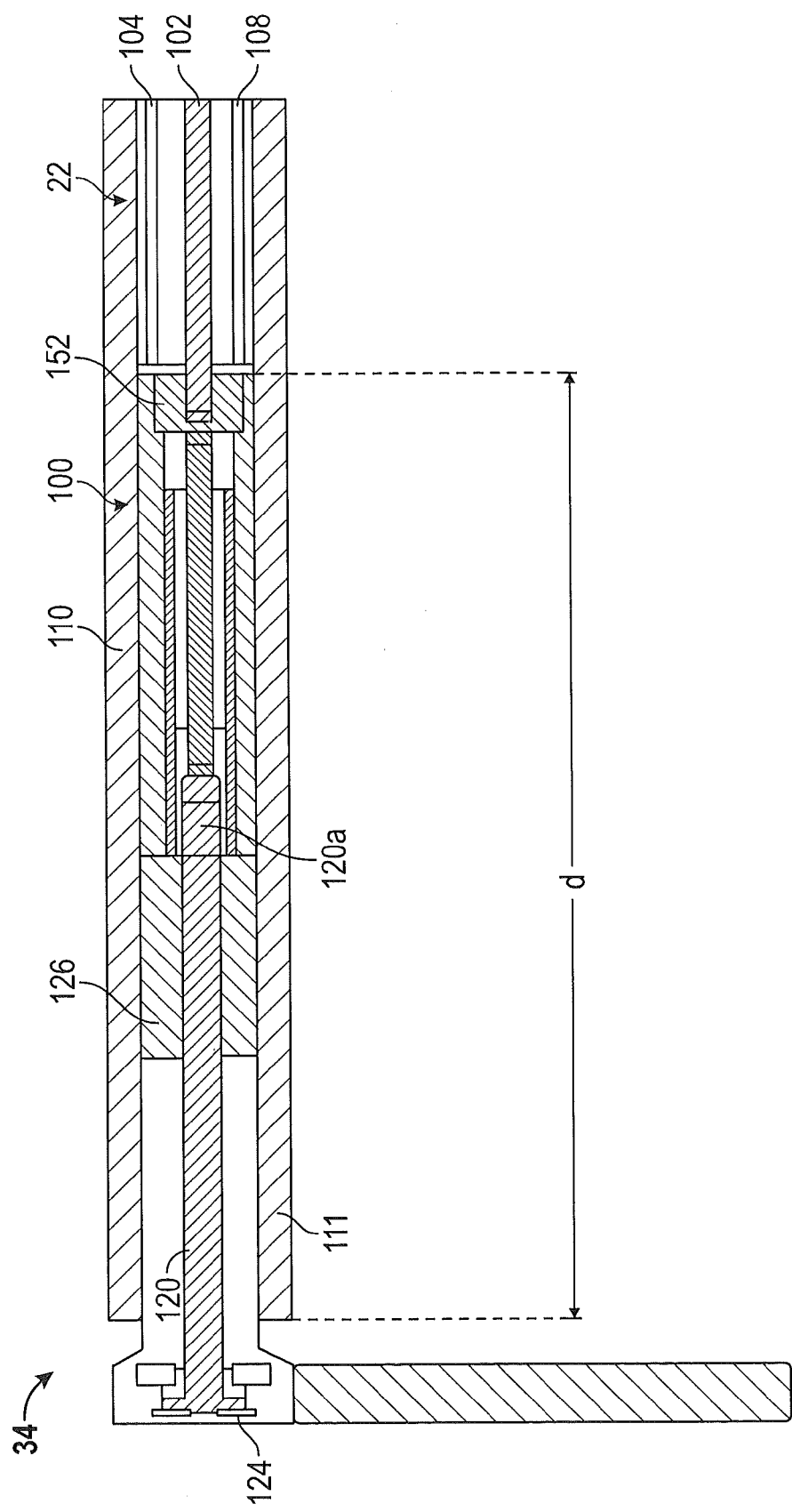
FIG. 4 is a partial side view of a coupler connected to a transmission line via a connector according to one embodiment.

In more detail, and referring now to FIG. 4, a transmission device 34 is shown coupled to a transmission line 22 by a connector 100. The illustrated transmission line 22 is a coaxial cable that includes an inner conductor 102 surrounded by a dielectric material 104. The transmission line 22 may also include a shield layer (not shown) that could be formed, for example, by a braided metal or metal foil layer. Regardless of how formed, the shield layer may be surrounded by an insulating layer 108 and may be electrically coupled to an outer conductor 110 in one embodiment. The outer conductor 110 can be rigid or semi-rigid and is formed of metal in one embodiment. The outer conductor 110 can extend the entire length of the transmission line 22 (e.g., from one coupler 34 at one end of a drill pipe segment to another coupler 34 at another end of the drill pipe segment). As an alternative, the outer conductor 110 may only surround regions of the transmission line 22.

Of course, the exact configuration of the transmission line could be varied. For instance, the inner conductor 102 could be formed by at least two electrically connected wires or a twisted pair and/or the shield layer 108 could be omitted. In one embodiment, the transmission line 22 is fixedly attached to the outer conductor 110, for example, by welding or otherwise connecting the transmission line 22 to the outer conductor 110. In all of the embodiments that follow it shall be assumed (if not explicitly illustrated) that the transmission line 22 is surrounded, at least at its ends, by an outer conductor and that the two are fixedly coupled to one another at least over a part of the length of the outer conductor While not illustrated it shall be understood that the outer conductor 110 can be located within a gun drilled section of the walls of the segments 14 (FIG. 1). In one embodiment, the outer conductor 110 is fixed within the segments.

It shall be understood that the distances between the pin and box end couplers 34 can vary. If a constant transmission line 22 length is used, there may be a need for an additional connector that compensates for variations of the drill pipe lengths, such as connector 100, to electrically connect the coupler 34 to the transmission line 22. Disclosed below are alternative connectors. Each connector embodiment is given a different reference numeral (e.g., 100, 200, 300, etc.) but shall generally be referred to a connector. All of the connectors disclosed herein can be formed in different lengths to accommodate for such segment length differences. In some cases, any of the connectors disclosed herein may itself accommodate segment length variation by having an adjustable length. This adjustment may be accomplished by including a telescoping region in any of the connectors disclosed herein. In some cases, the connector may exhibit a parasitic capacity due to its cylindrical shape and having a dielectric disposed between two charged surfaces. As will be understood, the capacitance of a particular connector depends on its length and, in some cases, this capacitance may need to be balanced by another tuned capacitor. An alternative would be to manufacture the different lengths of connectors with a constant capacitance by varying the diameter of the inner core.

As illustrated in FIG. 4, the coupler 34 includes a coupler connection 120 that extends away from the communication element 124 of the coupler 34. A portion 120a of the coupler connection 120 is shown passing through and extending beyond an optional sealing region 126. The seal region (or stack) 126 provides for seal between the coupler connection 120 and the outer conductor 110.

Figure 5:
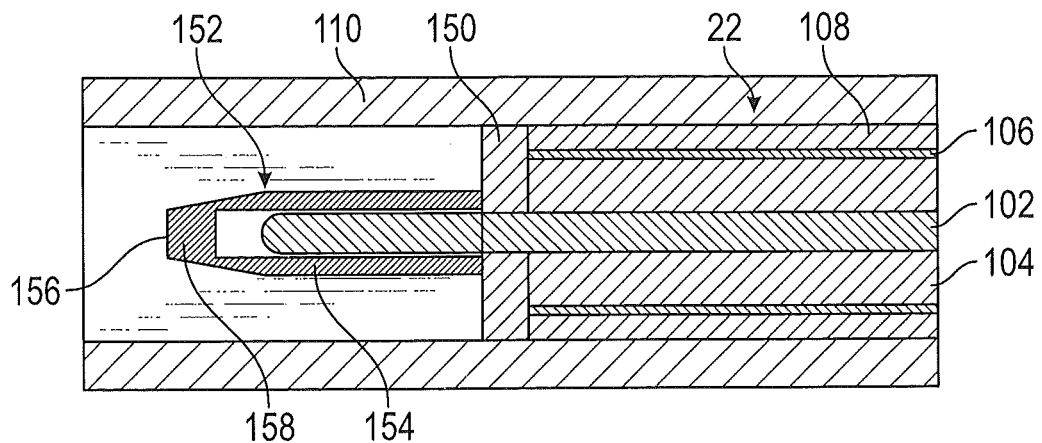
FIG. 5 is a cut-away side view of a transmission line disposed in an outer conductor.

As more clearly illustrated in FIG. 5, in the embodiment shown in FIG. 4, the transmission line 22 is formed such that the inner conductor 102 extends beyond an end of the dielectric material 104. The inner conductor 102 may also extend through and beyond an insulating disk 150 disposed at an end of the dielectric material. In the event that the inner conductor/dielectric are fixed relative to the outer conductor 110 the insulating disk 150 can provide a solid base on to which connectors 100 can be pressed. It shall be understood that the configuration of the transmission line 22 including the insulating disk 150 can be utilized with any of the connectors described herein.

Figure 6:
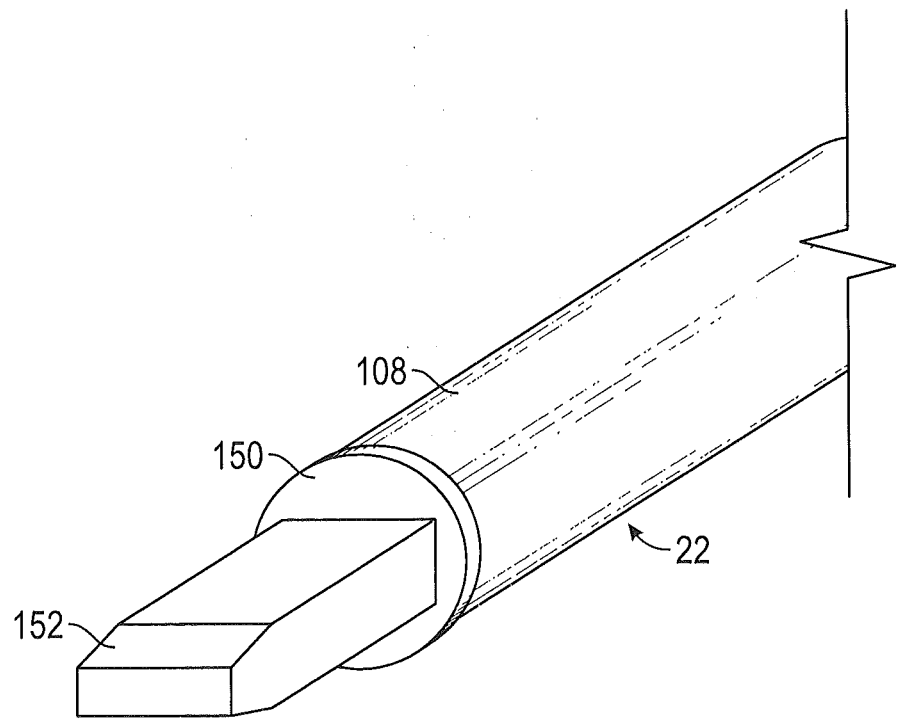
FIG. 6 is a perspective view of a transmission line that includes a conductive cap coupled thereto.

As illustrated in both FIGS. 5 and 6, a distal end of the inner conductor 102 is surrounded by a conductive cap 152. In the illustrated embodiment, the conductive cap 152 has a non-circular cross-section. Stated differently, the conductive cap 152 may be non-cylindrical in one embodiment. In particular, the conductive cap 152 can include a rectilinear base 154. In one embodiment, an end 156 of the conductive cap 152 also has a rectilinear shape that is similar to but smaller than the base 154. In addition, the conductive cap 152 can include a taper region 158 connecting the end 156 to the base 154. It shall be understood, however that the cap 152 is optional. In one embodiment, rather than include a cap, the end of the inner conductor 102 that extends beyond the dielectric could be deformed or reshaped such that it has a non-cylindrical cross section.

FIGS. 7A-C illustrate the construction of one embodiment of a connector 100. This embodiment is for use with at least the embodiment of the transmission line 22 shown in FIGS. 4-6. The connector 100 of this embodiment includes first and second female ends 202, 204 electrically coupled by a connector core 200. The first end 202 is configured to surround and electrically mate with the portion 120a of the coupler connection 120 that extends beyond the seal stack (FIG. 6). The second end 204 is shaped and configured such it can mate with the conductive cap 152 illustrated in FIGS. 7 and 8. As illustrated in FIG. 7B, the first end 202 and the conductor 200 are covered by an insulating layer 206. In one embodiment, the entire assembly shown in FIG. 7B can then be covered by a rigid, insulating outer coating 208. In another embodiment, the insulating layer and the outer coating could be integrally formed. In one embodiment, the outer coating 208 is formed of polyether ether ketone (PEEK) or similar high strength dielectric material. Referring again to FIG. 4, the outer coating 208 can serve not only to electrically insulate the connector 100 from the outer conductor 110 but also to provide a solid location onto which the optional seal stack 126 may be compressed.

As will be understood and with reference again to FIGS. 7A and 7B, the second end 204 can be shaped such that the conductive cap 152 is not completely surrounded by it nor does it concentrically surround the inner conductor 102. In that regard, the second end 204 can include gaps 210. The gaps 210 may be spaced and arranged such that at least a portion of them are filled by at least a portion of the conductive cap 152.

Referring again to FIG. 4, the coupler 34 may be connected to the transmission line 22 in several different manners. For example, the transmission line 22 could first be disposed in a channel in a pipe segment. Such disposal could include disposing a transmission line 22 that includes a conductive cap 152 that surrounds an end of the inner conductor 102 that extends beyond an end of the dielectric material 104 and, in one embodiment, beyond the insulating disk 150 (FIG. 5). According to one embodiment, a distance (d) from the insulating disk 150 to a reference location (e.g., an end 111 of the outer conductor 110) may be measured. The distance (d) can be used to select length of the connector 100 that is needed to electrically couple the coupler 34 to the communication electrical line inside the conduit 22. As described briefly above, the connector 100 may have a rigid portion that is in physical contact (or other force transferring arrangement) with the transmission line 22. The connector 100 of the desired length can then be inserted into the outer conductor 110 such that it mates with the inner conductor 102. The coupler 34 can then be arranged such that the coupler connector 120 is forced into electrical communication with the connector 100. This can include, for example, causing the optional seal stack 126 to compress against the connector 100. One of ordinary skill will understand that there are several different ways to affix the coupler 34 in a pipe segment including a press fit connecting and through the use of an adhesive.

Figure 8A:
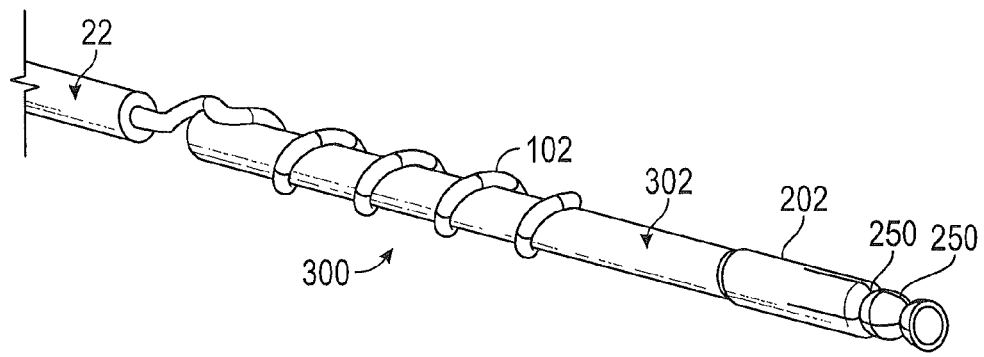
FIGS. 8A and 8B, respectively, show a perspective view of another embodiment of a connector and a cut-away side view of the connector of FIG. 8A surrounded by an insulating member.
Figure 8B:
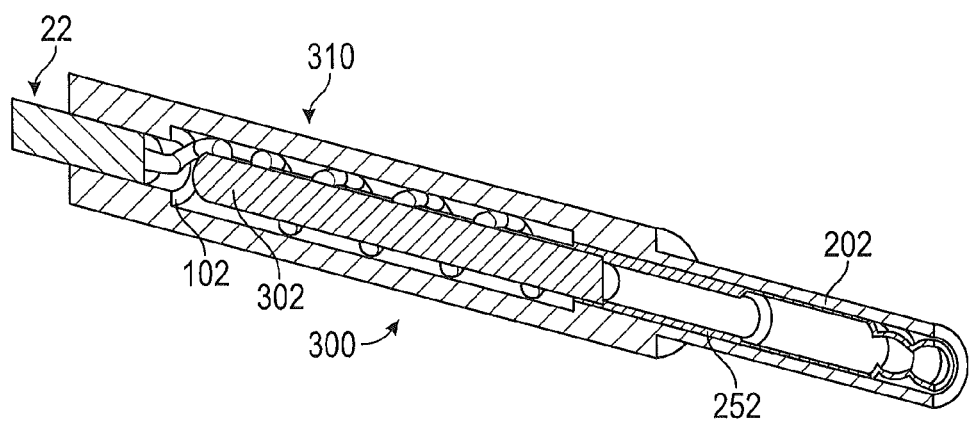
Figure 9:
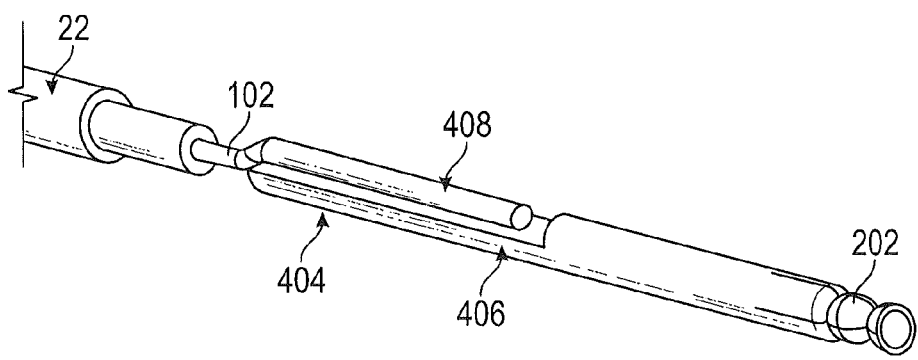
FIG. 9 is a perspective view of another embodiment of a connector.

FIGS. 8 and 9 show two different embodiments of connectors 300 and 400. These embodiments can include a first end 202 the same or similar to those as shown and described above. The first end 202 is, as above, shaped and configured to receive the coupler connector 120 within it and to make electrical contact therewith. The exact configuration can vary but as illustrated the first end 202 includes one or more preformed crimp sections 250 that can expand to receive the coupler connector 120 and then contract to ensure electrical connection to the coupler connector 120 or connector 100. As shown in FIG. 8B, the first end 202 includes a hollow region 252 into which the coupler connection 120 is received.

In the embodiment shown in FIG. 8A, the connector 300 includes a first end 202 and a connector core 302 that extends therefrom. In this embodiment, the inner conductor 102 of the transmission line 22 is wrapped around and in electrical communication with the connector core 302.

There are many manners in which the inner conductor 102 can be made to surround the connector core 302 in the manner illustrated in FIG. 8A. For example, the inner conductor 102 could be exposed form the dielectric material and then spirally wrapped around a shaft, dowel or other implement such that the radius of the spiral is less than the radius of the connector core 302. The connector core 302 may then be pressed into the spiral such that the spiral surrounds in the manner illustrated in FIG. 8A. In one embodiment, the inner conductor 102 is soldered to the connector core 302.

As illustrated in FIG. 8B, in one embodiment, a casing 310 can surround an end of the transmission line 22 and some or all of the connector core 302 that includes the inner conductor 102 wrapped around it. The casing 310, in one embodiment, can hold the connector 300 and the transmission line 22 in a fixed relationship to one another. The casing 310 can be formed of Peek in one embodiment.

In FIG. 9, another embodiment of a connector 400 includes a first end 202 and connector core 404 extending therefrom. The connector core 404 includes a recess 406 (e.g. a groove) formed in an outer side thereof. In one embodiment, the recess 406 is formed such that it is not coaxial with the other portions of the connector 400. In one embodiment, the inner conductor 102 is brazed or otherwise fixedly attached to the connector 400 in the recess 406. Some or all of the connector 400 and the transmission line 22 can be surrounded by a casing in the same or similar manner as described with respect to FIG. 8B.

Figure 10:
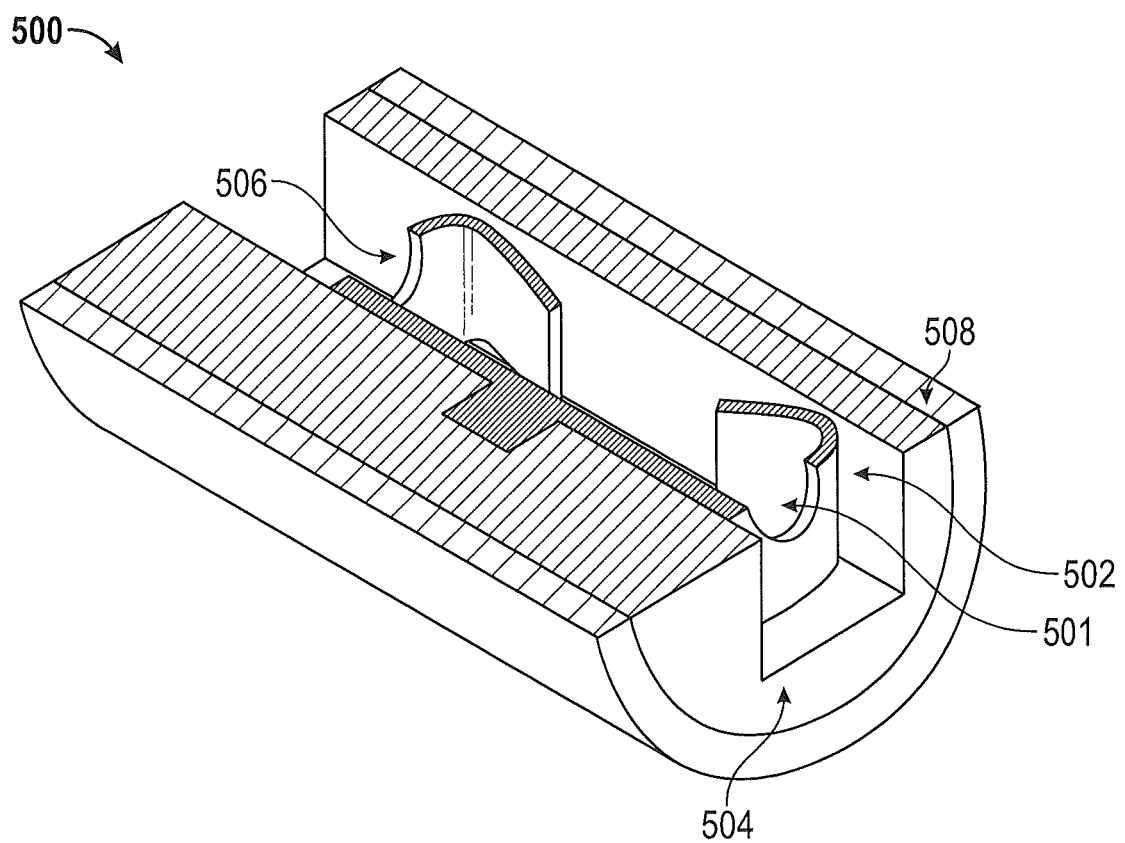
FIG. 10 is a cut-away side view of yet another embodiment of a connector.

FIG. 10 illustrates another embodiment of a connector 500 in a cut-away view. While a particular embodiment of connector 500 is shown, it shall be understood that the connector 500 can be defined as having two female receiving ends, both of which receive a conductor and that are electrically coupled to one another.

The illustrated connector 500 of this embodiment includes an inner conductive connection 502. This inner conductive connection 502 can be formed, for example an arcuated flat bar having receiving holes 506 formed in the curved regions 501 thereof. In one embodiment, the inner conductive connection 502 includes two curved regions 501 both of which include at least one receiving hole 506. The inner conductive connection 502 is disposed in an insulating sheath 504 which is surrounded by a rigid outer sleeve 508. In one embodiment, the insulating sheath 504 may be formed of a rigid material and may transmit force from a seal stack of a coupler to an outer conductor of the transmission line 22 or the transmission line itself.

Figure 11:
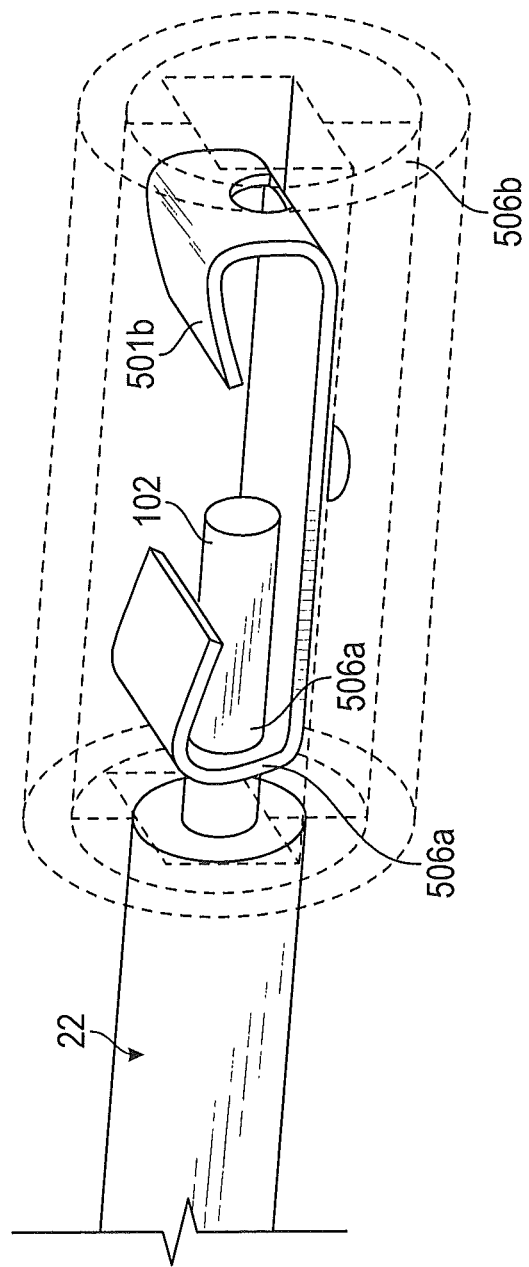
FIG. 11 is a phantom view of the connector of FIG. 10 shown connected to a transmission line.

FIG. 11 shows a phantom view of the connector 500 coupled to a transmission line 22. The receiving hole 506a of one of the curved regions 501a receives and makes electrical contact with an exposed end of the inner conductor 102. The other receiving hole 506b of the other curved region will, as will be understood by one of skill in the art, receive the coupler connection 120 (FIG. 4) or a length adjusting connector of a coupler.

The charge transfer only takes place at the outer diameter of the inner conductor so it is not necessary to have a solid conductive core. Thus, as will be understood, the inner conductor 102 of any of the embodiments disclosed herein could be formed as either a conductive tube or a conductive wire (e.g. solid core). The advantage of having a conductive tube lies in possible reduction of weight and material.

Figure 12:
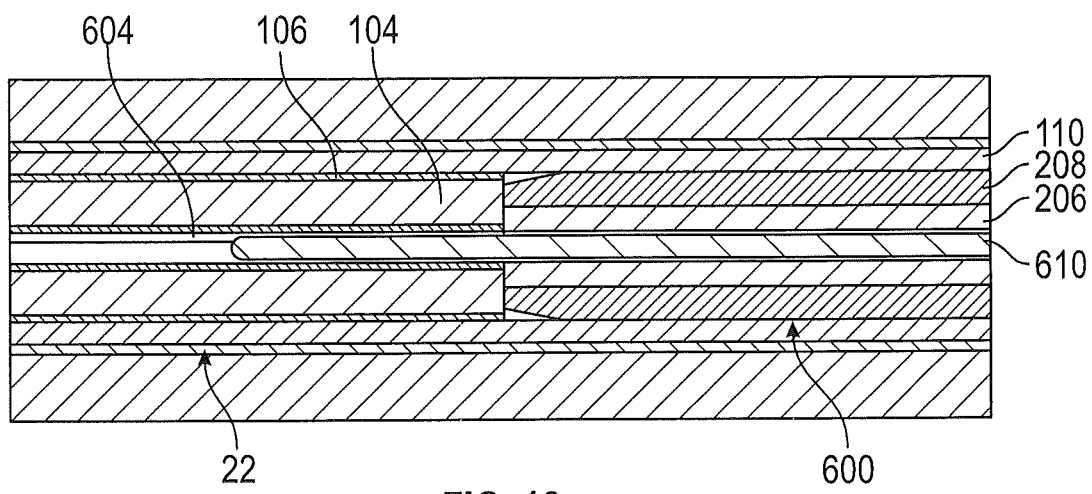
FIG. 12 illustrates another embodiment of a connector.

FIG. 12 illustrates another embodiment of a connector 600 coupled to a transmission line 22 that includes a conductive tube 504 that forms its inner conductor. While not illustrated, the connector 600 can include a first end 202 as shown in any of the prior embodiments. As opposed to the connector 100 of FIG. 7A, the connector 600 does not include a second end 204. Rather, in this embodiment, the connector 600 could be formed such that it does not include the first female end 202. Rather, in this embodiment, the connector core 610 fits into the inner diameter of the conductive tube 604. In this embodiment, the connector core 610 is inserted into the inner diameter of the conductive tube 604 to make electrical connection between them. The insulating layers 206 and 208 can be the same as described above.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A wired pipe segment comprising:
a body extending from a box end to a pin end;
a coupler located in one of the box end or the pin end, the coupler including a communication element and a coupler connector in electrical communication therewith and extending away from the communication element;
a transmission line extending away from the coupler towards the other of the box and pin end, the transmission line including an inner conductor surrounded by an insulating material, the inner conductor of the transmission line having an end with a non-cylindrical shape; and
a rigid connector that electrically connects the coupler to the transmission line;
wherein the end of inner conductor of the transmission line is formed by attaching a cap with a non-cylindrical cross-section in electrical connection with the inner conductor; and
wherein the connector includes a first end adapted to surround and make electrical contact with the coupler connector and a second end configured to mate with but not completely surround the end of the inner conductor of the transmission line.

2. The wired pipe segment of claim 1, wherein the end of inner conductor of the transmission line is made by reshaping of the inner conductor of the transmission line.

3. The wired pipe segment of claim 1, wherein the connector includes a connector core electrically coupling the first and second ends of the connector.

4. The wired pipe segment of claim 3, wherein the connector core is surrounded by an insulating material.

5. The wired pipe segment of claim 1, wherein the connector includes an insulating material that electrically insulates at least one of the first end, the second end and the connector core from the outer conductor.

6. The wired pipe segment of claim 1, wherein the transmission line includes an outer conductor that extends beyond the end of the inner conductor of the transmission line.

7. The wired pipe segment of claim 6, wherein the connector is disposed in the outer conductor.

8. The wired pipe segment of claim 1, further comprising: a seal stack surrounding the coupler connector and wherein the coupler connector and the seal stack are disposed at least partially within the outer conductor.

9. The wired pipe segment of claim 1, wherein the transmission line includes an insulating disk at an end of the insulating material.

10. The wired pipe segment of claim 1, wherein the second end of the connector includes at least one slot and a portion of the end extends into the slot.

11. The wired pipe segment of claim 10, wherein the second end includes two slots, both of which have a portion of the end extending into them.

12. The wired pipe segment of claim 1, wherein the coupler is one of: an inductive coupler, a capacitive coupler, a direct connection, an optic coupler, an acoustic coupler, and a resonant coupler or any combination of these.

13. A connector for use in connecting a communication element to a transmission line in a wired pipe segment, the connector comprising:
a first end adapted to make electrical contact with a coupler connector that extends away from a communication element of the coupler;
a second end configured to mate with an end of the inner conductor of the transmission line, the end of the inner conductor having non-cylindrical cross section and that does not completely surround an inner conductor of a transmission line; and
a rigid body between the first and second ends.

14. The connector of claim 13, further comprising:
a connector core electrically coupling the first and second ends.

15. The connector of claim 14, wherein the connector core is surrounded by an insulating material.

16. The connector of claim 13, wherein the connector is disposed in an outer conductor of the transmission line and includes an insulating material that electrically insulates at least one of the first end, the second end and the conduit connector from the outer conductor.

17. The connector of claim 13, wherein the second end includes at least one gap, the end of the inner conductor is formed by an end cap and a portion of the end cap extends into the gap.

18. The connector of claim 13, wherein the second end includes two gaps, both of which have a portion of the end cap extending into them.

* * * * *